(12) United States Patent
Lee et al.

(10) Patent No.: US 9,495,026 B2
(45) Date of Patent: Nov. 15, 2016

(54) TOUCH PANEL AND TOUCH-CONTROLLED DISPLAY DEVICE

(71) Applicant: HANNSTOUCH SOLUTION INCORPORATED, Tainan (TW)

(72) Inventors: Hui-Shu Lee, Tainan (TW); Yao-Chih Chuang, Tainan (TW); Ching-Feng Tsai, Tainan (TW)

(73) Assignee: HANNSTOUCH SOLUTION INCORPORATED, Tainan (TW)

( * ) Notice: Subject to any disclaimer, the term of this patent is extended or adjusted under 35 U.S.C. 154(b) by 307 days.

(21) Appl. No.: 13/962,965

(22) Filed: Aug. 9, 2013

(65) Prior Publication Data
US 2014/0184941 A1    Jul. 3, 2014

(30) Foreign Application Priority Data

Dec. 27, 2012 (TW) .............................. 101150562 A (51) Int. Cl.
*G06F 3/041* (2006.01)
*G06F 3/0354* (2013.01)

(52) U.S. Cl.
CPC ..... *G06F 3/041* (2013.01); *G06F 2203/04103* (2013.01)

(58) Field of Classification Search
CPC ................. G02F 1/13338; G06F 3/041; E06B 2009/2464
See application file for complete search history.

(56) References Cited

U.S. PATENT DOCUMENTS

| 8,730,195 B2 * | 5/2014 | Wu et al. ....................... 345/173 |
| 2008/0136787 A1 * | 6/2008 | Yeh et al. ..................... 345/173 |
| 2009/0273570 A1 * | 11/2009 | Degner et al. ................ 345/173 |
| 2009/0284487 A1 * | 11/2009 | Nakanishi et al. ........... 345/173 |
| 2012/0206395 A1 * | 8/2012 | Misaki ........................... 345/173 |
| 2012/0249465 A1 * | 10/2012 | Lin et al. ....................... 345/173 |
| 2013/0038545 A1 * | 2/2013 | Hsu et al. ..................... 345/173 |
| 2013/0058128 A1 * | 3/2013 | Cho .............................. 362/602 |
| 2013/0113713 A1 * | 5/2013 | Mienko ........................ 345/173 |
| 2013/0207911 A1 * | 8/2013 | Barton et al. ................. 345/173 |

(Continued)

FOREIGN PATENT DOCUMENTS

| CN | 102929026 | * | 2/2013 | ........... G02F 1/1333 |
| KR | 10-2012-0004344 | * | 7/2013 | ............. G06F 3/041 |

*Primary Examiner* — Lauren Nguyen
*Assistant Examiner* — Anthony G Quash
(74) *Attorney, Agent, or Firm* — CKC & Partners Co., Ltd.

(57) ABSTRACT

A touch panel and touch-controlled display device are provided. The touch panel includes a transparent substrate, a touch-sensitive electrode pattern, a decoration pattern and an electric-control trace. The transparent substrate includes a touch area and a surrounding area surrounding the touch area. The touch-sensitive electrode pattern is disposed on the touch area of the transparent substrate. The decoration pattern is disposed on the surrounding area of the transparent substrate to form a frame side part not surrounding the touch-sensitive electrode pattern. The electric-control trace is located in the surrounding area, stacked on the transparent substrate and the decoration pattern, and electrically connected to the touch-sensitive electrode pattern. Since the electric-control traces are with low-visibility characteristic, the electric-control traces are invisible from the transparent substrate.

16 Claims, 9 Drawing Sheets

(56) References Cited

U.S. PATENT DOCUMENTS

2013/0280463 A1* 10/2013 On et al. .......................... 428/38
2014/0125597 A1*  5/2014 Lee et al. ....................... 345/173
2014/0204284 A1*  7/2014 Yao et al. ........................ 349/12

* cited by examiner

TOUCH PANEL AND TOUCH-CONTROLLED DISPLAY DEVICE

RELATED APPLICATIONS

This application claims priority to Taiwan Application Serial Number 101150562, filed Dec. 27, 2012, which are herein incorporated by reference.

BACKGROUND

Technical Field

The disclosure relates to a touch panel. More particularly, the disclosure relates to a touch panel having a decoration pattern frame with reduced number of frame side parts.

Description of Related Art

Currently, the touch technology has been widely applied in displayers of various electronic devices for manufacturing a touch-controlled display device. By touching a specific position of the touch-controlled display device, sense is generated at this specific position to input data or an instruction into an electronic device.

A traditional touch-controlled display device includes a display panel and a touch panel stacked on the display panel. The touch panel includes touch-sensitive electrodes to be touched. The touch-sensitive electrodes are electrically connected with corresponding metal traces and a control circuit board. Since in the touch-controlled display device the metal electric-control traces arranged around the touch panel are shielded by an enclosed decoration pattern frame, such as an enclosed black matrix (BM) frame, the metal electric-control traces are not exposed on the touch panel.

However, the black matrix frame on the touch-controlled display device reduces a visual area of the touch-controlled display device and affects visual experience of a consumer during operation, which goes against the trend of removing or minimizing the black matrix frame of the touch-controlled display device in the current design.

SUMMARY

The disclosure provides a touch panel and a touch-controlled display device, for reducing the area of a decoration pattern frame, at least for reducing the number of the frame side parts of the decoration pattern frame, so as to expand a visual area of the touch-controlled display device.

In one aspect of the disclosure, the touch panel is implemented on a touch-controlled display device, and includes a transparent substrate, a touch-sensitive electrode pattern, a decoration pattern and multiple electric-control traces. The transparent substrate includes a touch area and a surrounding area defined on the same surface of the transparent substrate. The surrounding area surrounds the touch area. The touch-sensitive electrode pattern is disposed on the touch area of the transparent substrate. The decoration pattern is disposed on the surrounding area of the transparent substrate to form a frame side part not surrounding the touch-sensitive electrode pattern. The electric-control traces are located in the surrounding area, stacked on the transparent substrate and the decoration pattern, and electrically connected to the touch-sensitive electrode pattern. Since the electric-control traces have low visibility characteristic, the electric-control traces are invisible from the transparent substrate.

In one embodiment, the electric-control trace may be made of light-permeable material. The light-permeable material for example may be transparent conductor oxide (TCO), nano silver, carbon nano tube or Graphene oxide. The TCO for example may be indium tin oxide, indium zinc oxide or aluminum zinc oxide. The TCO for example may be a transparent conductive thin film.

In another embodiment, the electric-control trace comprises a micron-size width. The micron-size width of the electric-control trace for example is less than 50 micrometers or in a range of 2-10 micrometers; alternatively, the material of the electric-control trace is for example conductive metal or conductive non-metal; or alternatively, the electric-control trace includes a metal-mesh structure.

In a variation of a further embodiment, the shape of the touch-sensitive electrode pattern is a rectangle, and the decoration pattern is only adjacently disposed at one side of the touch-sensitive electrode pattern. Thus, the portions of the surrounding area surrounding the rest three sides of the touch area completely have no decoration pattern.

In another variation of a further embodiment of the disclosure, the shape of the touch-sensitive electrode pattern is a rectangle, and the decoration pattern has two decoration pattern strips are respectively adjacently disposed at two opposite sides of the touch-sensitive electrode pattern. Thus, the portions of the surrounding area surrounding the rest two opposite sides of the touch area completely have no decoration pattern.

In an embodiment, the touch-sensitive electrode pattern includes a single-layer transparent sensing circuit.

In another embodiment, the touch-sensitive electrode pattern includes a sensing electrode pattern layer, a sensing wiring layer and an insulation layer. The sensing electrode pattern layer is directly disposed on the transparent substrate. The sensing wiring layer is disposed on the transparent substrate. The insulation layer is disposed between the sensing electrode pattern layer and the sensing wiring layer, and blocks the electrical connection between the sensing electrode pattern layer and the sensing wiring layer.

In other variations of the embodiments, the material of the transparent substrate is glass or plastic; and/or the transparent substrate is a color filter, an active component array substrate or a polarizing plate.

In another aspect of the disclosure, the touch panel includes a transparent substrate, a decoration pattern and a transparent layer. The transparent substrate includes a touch area and a surrounding area surrounding the touch area defined on the same surface of the transparent substrate. The decoration pattern is disposed on the surrounding area of the transparent substrate to form at least one frame side part not completely surrounding the touch-sensitive electrode pattern. The transparent layer is located on the transparent substrate and the decoration pattern, and directly contacts the transparent substrate and the decoration pattern. The transparent layer includes a touch-sensitive electrode pattern and multiple electric-control traces. The touch-sensitive electrode pattern is disposed on the touch area of the transparent substrate. The electric-control traces are disposed on the surrounding area, and at least one part of the electric-control traces is disposed on the decoration pattern.

In a variation of an embodiment, the transparent layer is transparent conductor oxide (TCO), carbon nano tube or Graphene oxide. The TCO for example may be tin indium oxide, indium zinc oxide or aluminum zinc oxide. The TCO for example may be a transparent conductive thin film.

In a variation of an embodiment, the transparent layer has a metal-mesh structure.

In another embodiment, the touch panel further includes a protecting layer. The protecting layer is located on the transparent layer and the decoration pattern and directly contacts the transparent layer and the decoration pattern.

In a further embodiment, the touch-sensitive electrode pattern and the electric-control traces are integrated together.

In still a further embodiment, the shape of the touch-sensitive electrode pattern is a rectangle, and the decoration pattern is only adjacently disposed at one side of the touch-sensitive electrode pattern, thus, the portions of the surrounding area surrounding three sides of the touch area have no decoration pattern, completely.

In view of the above, since the electric-control traces of the touch panel of the disclosure are invisible, it is not required to use a shield frame to shield the electric-control traces, which is beneficial for reducing the area of the screen frame, and can even reduce the number of the frame side part of the screen frame so as to expand the visual area of the touch-controlled display device and increase the appearance beauty thereof. Furthermore, the aforesaid structure of the touch panel of the disclosure can also simplify the processing steps, further improve the yield, and avoid increase of the material and development cost.

BRIEF DESCRIPTION OF THE DRAWINGS

In order to make the foregoing as well as other aspects, features, advantages, and embodiments of the disclosure more apparent, the accompanying drawings are described as follows.

DETAILED DESCRIPTION

The spirit of the disclosure will be described clearly through the drawings and the detailed description as follows. Any of those of ordinary skills in the art can make modifications and variations from the technology taught in the disclosure after understanding the embodiments of the disclosure, without departing from the sprite and scope of the disclosure.

The disclosure provides a touch panel and a touch-controlled display device having the touch panel. By in-visualizing an electric-control trace to become invisible in a visual area of the touch-controlled display device, it is not required to use an enclosed decoration pattern (shielding pattern) frame to shield the electric-control trace around the touch panel, so as to at least reduce the frame side part number of the decoration pattern frame, and further expand the visual area of the touch-controlled display device and increase the appearance beauty thereof.

Figure 1:
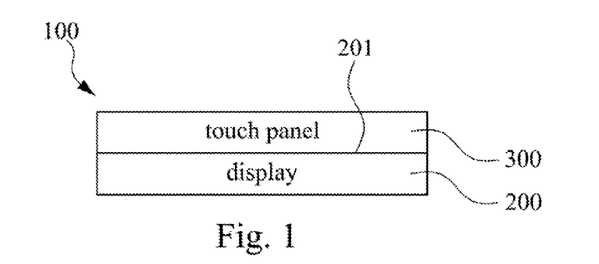
FIG. 1 is a schematic view of stacked layers of a touch-controlled display device of the disclosure.

Reference is made to FIG. 1. FIG. 1 is a schematic view of stacked layers of a touch-controlled display device 100.

The touch-controlled display device 100 includes a display 200 and a touch panel 300. The touch panel 300 is stacked on the active display area 201 of the display 200, such that a user can touch the touch panel 300 according to the content of the display 200. The display 200 for example is a liquid crystal display (LCD), an organic light-emitting diode (OLEO) display, a plasma display panel (PDP), an electronic paper (e-paper) or the like. However, the disclosure is not limited to those sorts only.

Figure 2:
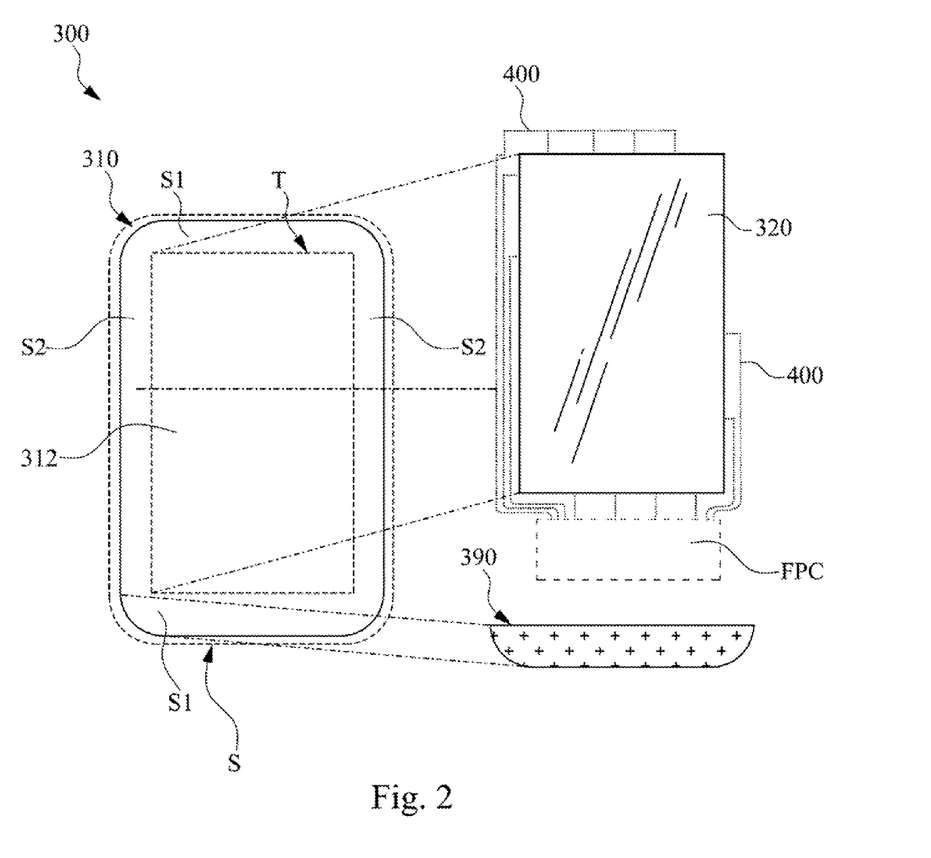
FIG. 2 is an exploded view of a touch panel of the disclosure in an aspect.
Figure 3:
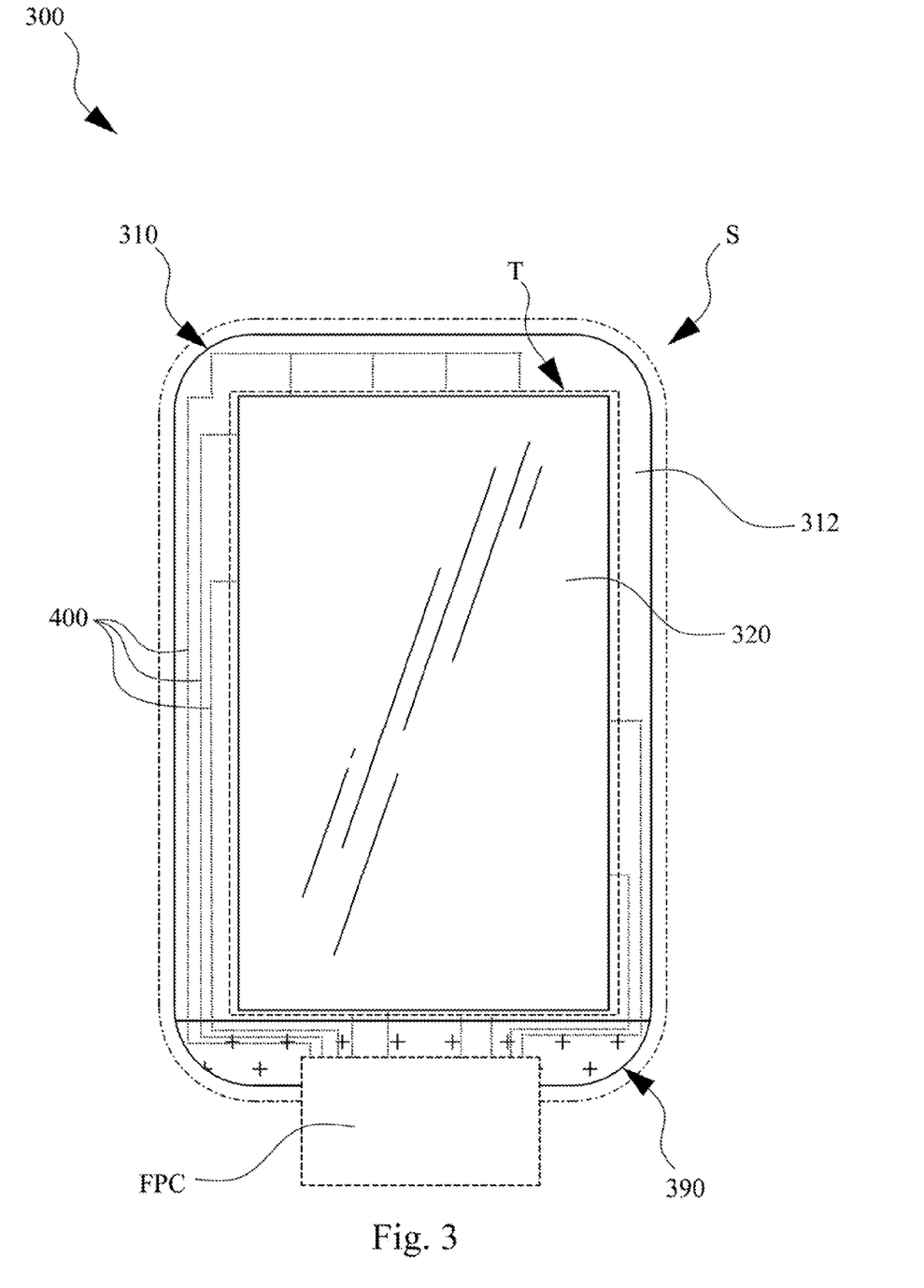
FIG. 3 is a combined top view of FIG. 2.
Figure 4:
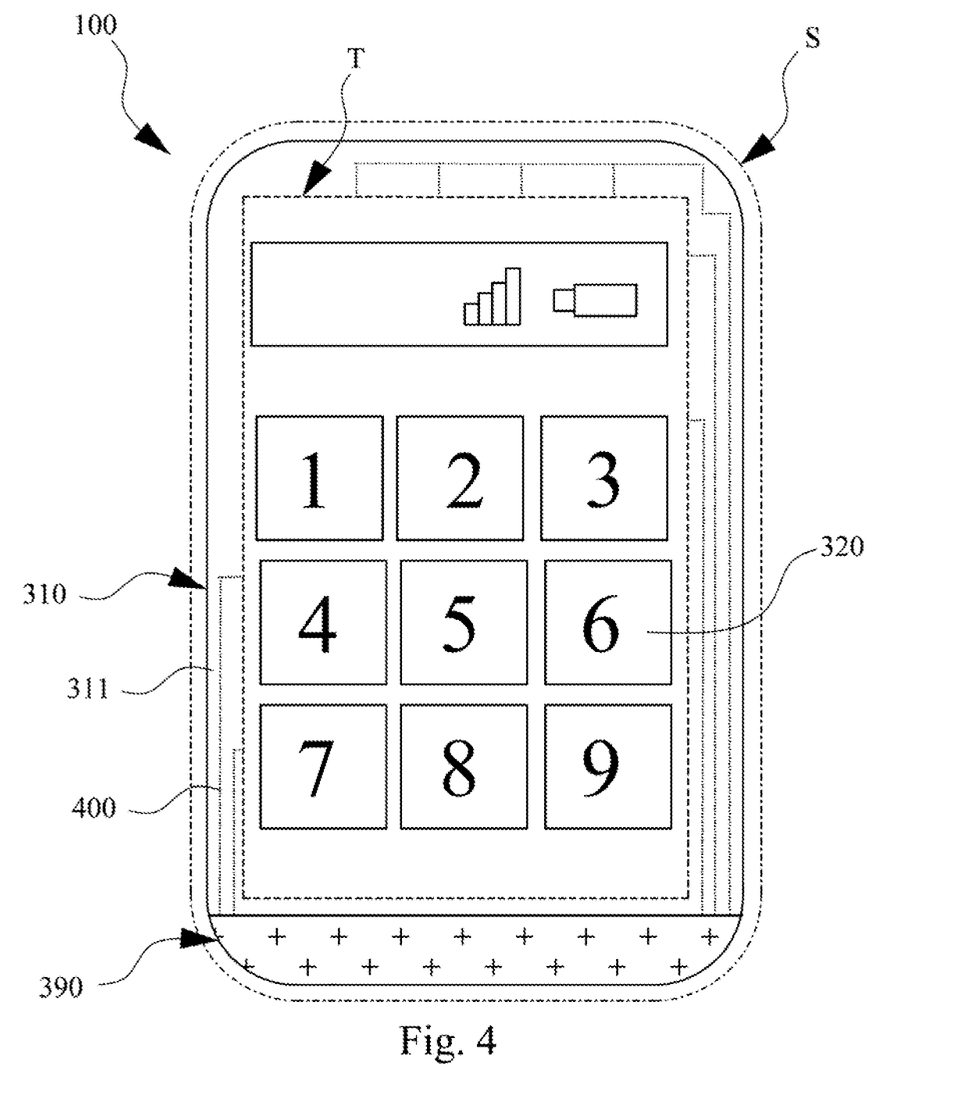
FIG. 4 is a schematic front view of the touch-controlled display device of the disclosure during operation.

References are made to FIGS. 2-4, FIG. 2 is an exploded view of the touch panel 300 of the disclosure in an aspect. FIG. 3 is a combined top view of FIG. 2. FIG. 4 is a schematic front view of the touch-controlled display device 100 of the disclosure during operation.

The touch panel 300 of the disclosure includes a transparent substrate 310, a touch-sensitive electrode pattern 320, at least one decoration pattern 390 and a flexible circuit board FPC. The transparent substrate 310 includes a front surface 311 (FIG. 4) and a rear surface 312 disposed opposite to the front surface 311. A touch area T and a surrounding area S are both defined on the rear surface 312 of the transparent substrate 310. The touch area T is located in the central area of the transparent substrate 310, and the surrounding area S corresponding to or approximately corresponding to the edge portions of the rear surface 312 of the transparent substrate 310, surrounds the touch area T adjacently. The touch-sensitive electrode pattern 320 is disposed on the rear surface 312 of the transparent substrate 310, and located in the touch area T. The touch-sensitive electrode pattern 320 is electrically connected with the flexible circuit board FPC via multiple electric-control traces 400. The decoration pattern 390 is disposed on the rear surface 312 of the transparent substrate 310, and located in the surrounding area S to form one or more frame side parts not completely surrounding the touch-sensitive electrode pattern 320, such that the decoration pattern 390 does not completely shield the entire periphery of the rear surface 312 of the transparent substrate 310, and thus the visual area of the touch-controlled display device 100 is expanded. That is, the decoration pattern 390 of the embodiment is a non-enclosed decoration pattern frame, substantially, the non-enclosed decoration pattern is a decoration pattern strip (bar) which only occupies one frame side part of the surrounding area S. In the embodiment, the decoration pattern 390 can be made of black decoration material or other color decoration material.

The electric-control traces 400 are winded and arranged at intervals in the surrounding area S of the rear surface 312 of the transparent substrate 310, and meanwhile, are stacked on the decoration pattern 390 and the rear surface 312 of the transparent substrate 310. One end of the electric-control trace 400 is electrically connected to the touch-sensitive electrode pattern 320, and the other end of the electric-control trace 400 is located on the decoration pattern 390 and is electrically connected to the flexible circuit board FPC.

It should be illustrated that in this embodiment, the touch-sensitive electrode pattern 320 is only located in the touch area T, and the area size of the touch-sensitive electrode pattern 320 almost matches the area size of the touch area T, and the touch-sensitive electrode pattern 320 is surrounded by the surrounding area S. In the embodiment, the touch area T is within the surrounding area S and defined by the surrounding area S. The decoration pattern 390 is located in the surrounding area S, but not completely surrounds the touch-sensitive electrode pattern 320, such that it can be seen that a portion of the electric-control trace 400 is exposed in a part of the surrounding area S not having the decoration pattern 390.

Although a segment of each of the electric-control traces 400 is not shielded by the decoration pattern 390, the material or the size of the electric-control traces 400 may be further designed to enable the electric-control traces 400 to have low visibility characteristics. In other words, as shown in FIG. 4, since the electric-control traces 400 have low visibility characteristics, when the touch-controlled display device 100 is utilized, and the front surface 311 of the transparent substrate 310 is viewed by human naked eyes, these electric-control traces 400 located in the surrounding area S of the transparent substrate 310 is not easily recognized or noticed by human naked eyes. Therefore, these electric-control traces 400 can be omitted by the human naked eyes, thus these electric-control traces 400 bring the invisible or low visibility effects shown on the transparent substrate 310.

In an embodiment, these electric-control traces 400 (as shown in FIG. 2) for example may be formed by using transparent (light-permeable) material, such that the electric-control traces 400 are transparent to human naked eyes, or at least the electric-control traces 400 are light-permeable. Therefore, the electric-control traces 400 located in the surrounding area S of the transparent substrate 310, which are not shielded by the decoration pattern 390, are not easily recognized by human naked eyes, and the electric-control traces 400 are not easily noticed, so as to bring the invisible or low visibility effects shown on the transparent substrate 310.

The transparent material for example is a transparent conductor oxide (TCO), nano silver, carbon nano tube or Graphene oxide. The TCO for example is indium tin oxide (ITO), indium zinc oxide (IZO) or aluminum zinc oxide. The TCO for example may be a transparent conductive thin film. When both the touch-sensitive electrode pattern 320 and the electric-control trace 400 are made of the same material (such as transparent conductive material) and formed in same layer, the touch-sensitive electrode pattern 320 and the electric-control trace 400 for example together constitute a so-called one-layer structure. However, the disclosure is not limited to those sorts only. It is not limited to use the transparent material to manufacture the total length or partial segment of the electric-control trace 400 of this embodiment. For example, only the segment of the electric-control trace 400 not shielded by the decoration pattern 390 is made of the light-permeable material, and the rest segments of the electric-control trace 400 shielded by the decoration pattern 390 may be made of a light-tight metal material with a better conducting performance.

In another embodiment, during manufacture these electric-control traces 400 for example may be miniaturized (or referred to as thinned), such that the electric-control traces 400 only have micron-size widths, such as less than 50 micrometers or preferably in a range of 2-10 micrometers. Therefore, the electric-control traces 400 located in the surrounding area S of the transparent substrate 310 not shielded by the decoration pattern 390 are not easily recognized or noticed by human naked eyes to have transparent effect, so as to bring the invisible or low visibility effects shown on the transparent substrate 310.

The material of the miniaturized electric-control trace 400 is for example conductive metal or conductive non-metal. When both the touch-sensitive electrode pattern 320 and the miniaturized electric-control trace 400 are made of micron-size widths of metal, the touch-sensitive electrode pattern 320 and the miniaturized' electric-control trace 400 for example together constitute a one-layer metal-mesh structure. That means the metal mesh lines in the touch-sensitive electrode pattern 320 also have micron-size widths. In this embodiment, it is not limited to miniaturize the total length or partial segment of the electric-control trace 400. For example, only the segment of the electric-control trace 400 not shielded by the decoration pattern 390 is miniaturized, and the rest segments of the electric-control trace 400 shielded by the decoration pattern 390 may be designed as having a large wire width or inner diameter to improve the conducting performance.

However, the disclosure is not limited to this. In manufacture of the electric-control traces 400, the light-permeable material may be used while the miniaturization process is performed.

Particularly, reference is made back to FIG. 2. If the entire shape of the touch-sensitive electrode pattern 320 (or the touch area T) is a rectangle, and the entire shape of the surrounding area S is appeared with a lager rectangle frame having the touch-sensitive electrode pattern 320 within the lager rectangle frame. The surrounding area S includes two opposite strip-shaped areas S1 with short sides and two opposite strip-shaped areas S2 with long sides. Any one of the two opposite strip-shaped areas S1 with short sides is communicated between the two opposite strip-shaped areas S2 with long sides, and the extending direction of any one of the two opposite strip-shaped areas S1 with short sides is intersected with the extending direction of the two opposite strip-shaped areas S2 with long sides.

Reference is made to FIG. 3. In a variation of an embodiment of the disclosure, when the decoration pattern 390 is elongated, for example appeared with, or approximately appeared with a straight-line shape, the decoration pattern 390 is only located in one of the two opposite strip-shaped areas S1 with short sides, completely or partially filled up the strip-shaped area S1 with short sides, and is only adjacently disposed at one side of the touch-sensitive electrode pattern 320. Therefore, since the decoration pattern 390 is only located in one of the two opposite strip-shaped areas S1 with short sides, only one frame side part of the touch-sensitive electrode pattern 320 is formed, rather than a enclosed decoration pattern frame which encloses the touch-sensitive electrode pattern 320. Therefore, the rest portions of the surrounding area S surrounding the other three sides of the touch area T (i.e., the other strip-shaped area S1 with short sides and the two opposite strip-shaped areas S2 with long sides) completely have none of the decoration pattern.

Figure 5:
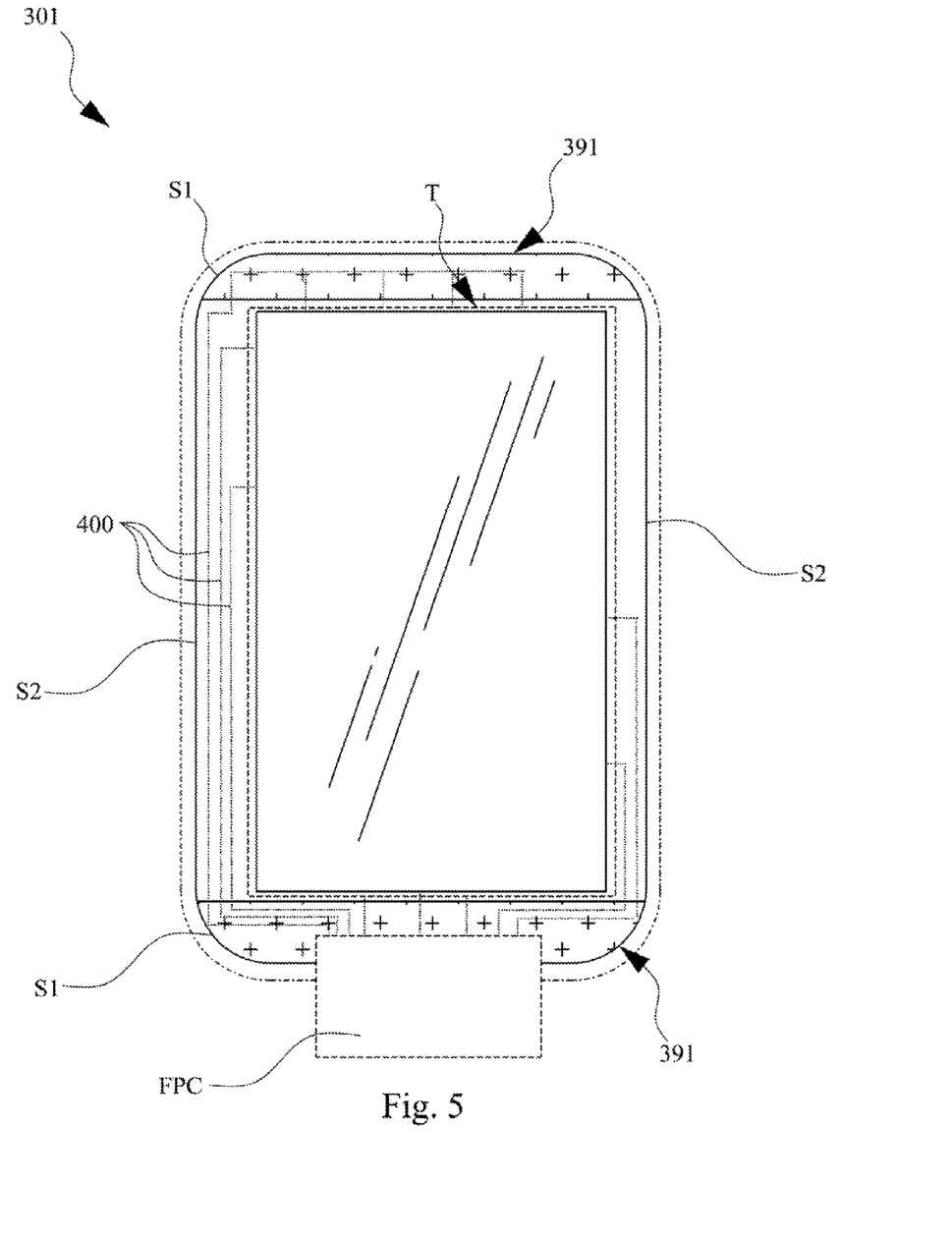
FIG. 5 is a schematic view of another embodiment of the touch panel of the disclosure.
Figure 6:
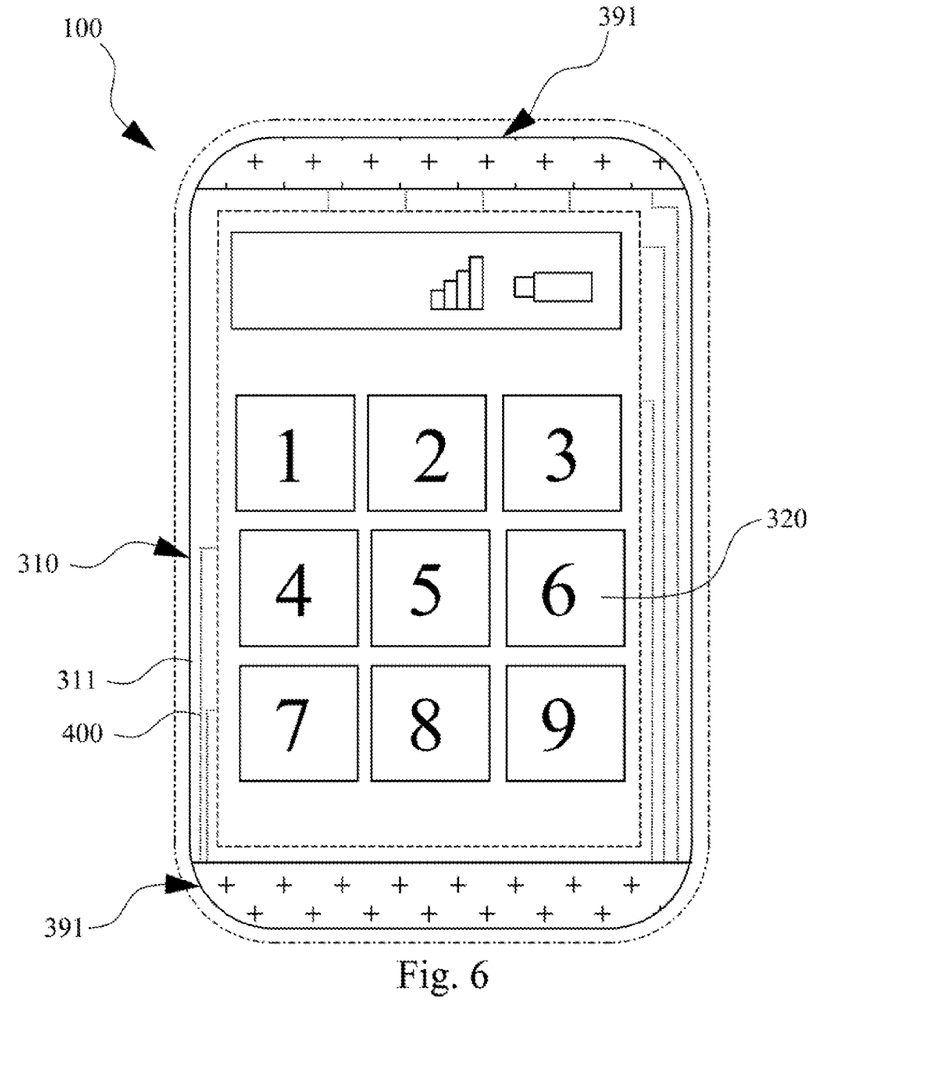
FIG. 6 is a schematic front view of the touch-controlled display device of FIG. 5 during operation.

References are made to FIGS. 5 and 6. FIG. 5 is a schematic view of another embodiment of the touch panel 301 of the disclosure. FIG. 6 is a schematic front view of the touch-controlled display device 100 of FIG. 5 during operation.

In another variation of the embodiment of the disclosure, when the decoration pattern 391 comprises two decoration pattern strips, for example appeared with or approximately appeared with a straight-line shape, the two decoration pattern strips are respectively located in the two opposite strip-shaped areas S1 with short sides, completely or partially filled up the two strip-shaped areas S1 with short sides, and are adjacently disposed at two opposite sides of the touch-sensitive electrode pattern 320. Therefore, as the FIG. 6 shown, since the two decoration patterns 391 are located in the two strip-shaped areas S1 with short sides, only two opposite frame side parts of the touch-sensitive electrode pattern 320 are formed, rather than an enclosed decoration pattern frame which encloses the touch-sensitive electrode pattern 320.

Therefore, the rest portions of the surrounding area S on two opposite sides of the touch area T (i.e. the two opposite strip-shaped areas S2 with long sides) completely have none of the decoration pattern.

Compared with the four frame side parts of a conventional enclosed decoration pattern frame, the single decoration pattern 390 of FIG. 2 described above can reduce the number of the frame side parts of the conventional enclosed decoration pattern frame to expand the visual area of the touch-controlled display device 100 and improve the appearance beauty thereof.

However, the disclosure is not limited to this, and as deduced by analogy, the decoration pattern 390 may be appeared with an L shape (not shown) and thus located surrounding two adjacent sides of the touch-sensitive electrode pattern 320; or alternatively, the decoration pattern 390 may be appeared with a U shape and thus located surrounding three sides of the touch-sensitive electrode pattern 320.

In the aforesaid variations, preferably the decoration pattern 390 may only shield the electrical connection portion where the flexible circuit board FPC connected to the other end of the electric-control trace 400.

In particular, the transparent substrate 310 (Cover Lens) used for protecting the touch-sensitive electrode pattern 320, and the material thereof for example is a transparent thin plate made of glass or plastic or polyimide. The plastic for example is a transparent thin plate made of polycarbonate (PC), polyethylene terephthalate (PET), polymethyl methacrylate (PMMA), cyclic olefin copolymer (COC) or the like. However, the disclosure is not limited to this.

The components of the decoration pattern 390 are for example light-tight (light-block) materials or materials not easy to be penetrated by light, such as a printing ink, color photoresist, organic material or inorganic material, which can be applied on the perimeter portion at the inner surface of the transparent substrate 310 through conventional technical means such as direct printing, coating or metal evaporation. Alternatively, the decoration pattern 390 for example is referred to as a black matrix or a black decoration (shielding) layer. However, the disclosure is not limited to this and the color of the decoration pattern 390 is not limited to black.

The area size of the touch area T almost matches the area size of the touch-sensitive electrode pattern 320 (such as an indium tin oxide (ITO) circuit). The active display area 201 of the display 200 (as shown in FIG. 1) may also be changed to have an area size consistent with that of the touch area T, based on the area size of the touch area T. The touch-sensitive electrode pattern 320 may be directly applied on the inner surface of the transparent substrate 310 through processes such as sputtering and etching. However, the disclosure is not limited to this.

Furthermore, the touch panel 300 is not limited to be of capacitor-type touch panel or resistor-type touch panel, and the disclosure is not limited to this. The structure type of the touch panel 300 is not limited, for example may be a single-layer, multi-layer or dual-layer touch panel. In the single-layer touch panel, the touch-sensitive electrode patterns are disposed on surfaces at the same side of the transparent substrate, and the specific structure variations thereof are very extensive. In the disclosure, the structure variation of the single-layer touch panel is not limited designedly. The following description is only used for illustration and is not intended to limit the disclosure.

Figure 7A:
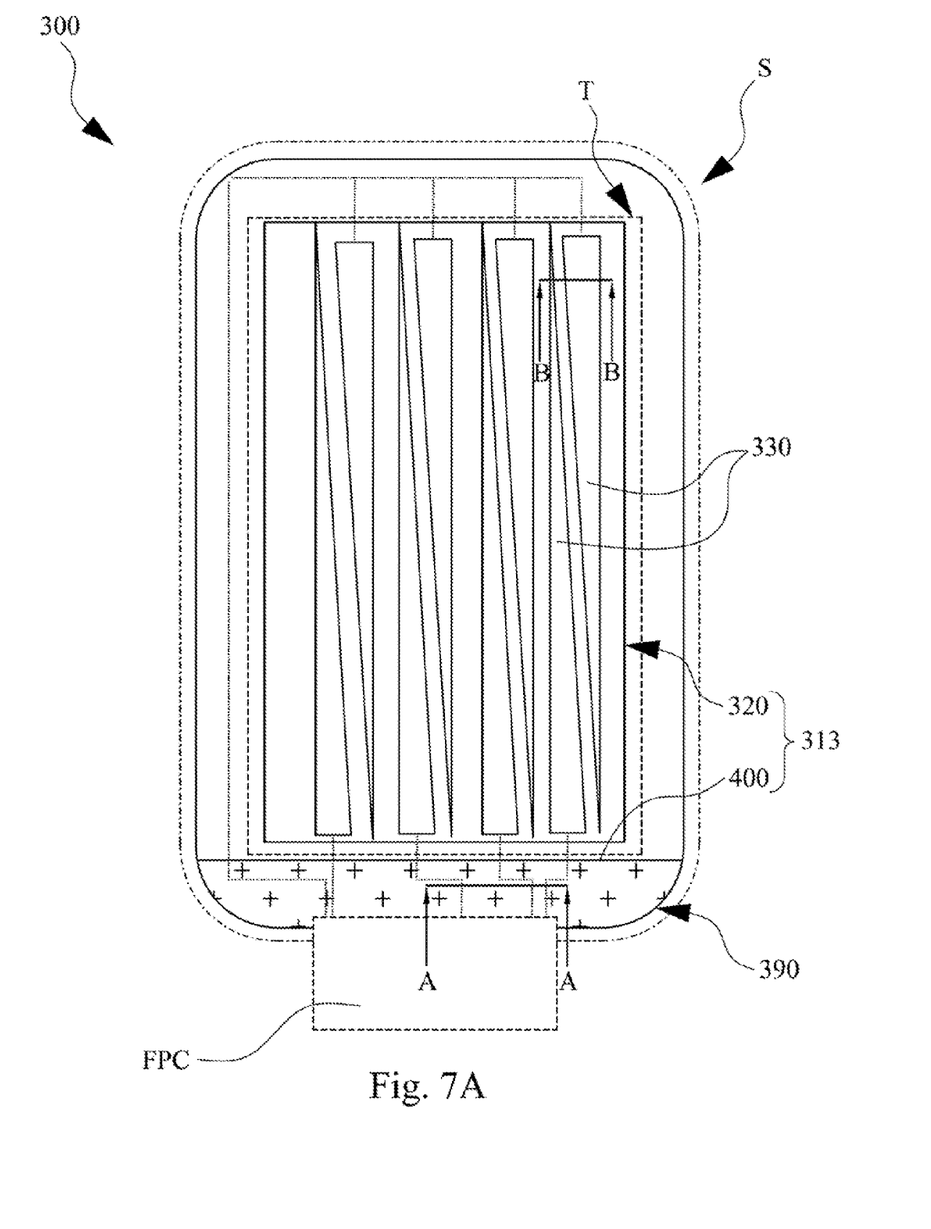
FIG. 7A is a schematic top view of an embodiment of the touch panel of the disclosure.
Figure 7B:
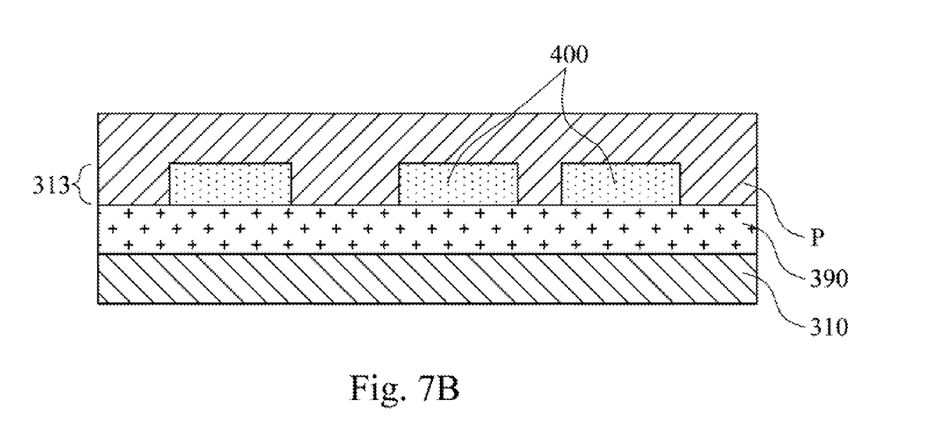
FIG. 7B is a cross-sectional view along a cutting line A-A of FIG. 7A.
Figure 7C:
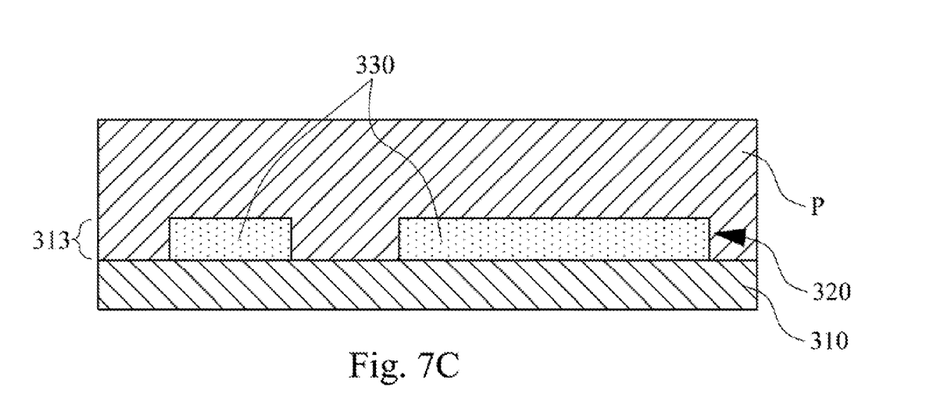
FIG. 7C is a cross-sectional view along a cutting line B-B of FIG. 7A.

Reference is made to FIG. 7A. FIG. 7A is a schematic top view of an embodiment of the touch panel 300 of the disclosure. FIG. 7B is a cross-sectional view along a cutting line A-A of FIG. 7A. FIG. 7C is a cross-sectional view along a cutting line B-B of FIG. 7A.

The touch-sensitive electrode pattern 320 is disposed on the touch area T and comprises multiple electrode patterns 330 arranged at intervals. The electrode patterns 330 are presented with acute angles (such as right-angled triangles) and each two thereof are disposed oppositely. One end of each of the electric-control traces 400 is connected with each of the multiple electrode patterns 330 through the two strip-shaped areas S1 with short sides, and at least part (the other end) of each of the electric-control traces 400 is disposed on the decoration pattern 390, finally extending to connect with the flexible circuit board FPC.

Since the touch-sensitive electrode pattern 320 and the electric-control traces 400 are simplified into a single-layer transparent sensing circuit or a one-layer electrode structure which are made of the same material and formed in the same layer, the touch panel 300 of the disclosure can be manufactured only by using two development processes for preparing the one-layer electrode structure and the decoration pattern 390, which not only simplifies the processing steps but also reduces the material and processing cost.

In other words, the touch-sensitive electrode pattern 320 and the multiple electric-control traces 400 can be integrated in the same process to form a transparent layer 313 with a one layer structure (e.g., a one-layer transparent sensing circuit). Therefore, the transparent layer 313 (including the touch-sensitive electrode pattern 320 and the electric-control traces 400) is located on the transparent substrate 310 and the decoration pattern 390, and in one embodiment, the transparent layer 313 directly contacts the transparent substrate 310 and the decoration pattern 390.

In a variation of the embodiment, the transparent layer is a transparent conductor oxide (TCO), carbon nano tube or Graphene oxide. The TCO for example may be tin indium oxide, indium zinc oxide or aluminum zinc oxide. The TCO for example may be a transparent conductive thin film. In another variation of the embodiment, the transparent layer for example may be a metal-mesh structure. Although the aforesaid touch-sensitive electrode pattern 320 and electric-control traces 400 are integrated in the same process, it is not limited whether the aforesaid touch-sensitive electrode pattern 320 and the electric-control traces 400 are made of the same material or different materials.

In an embodiment of the disclosure, as shown in FIGS. 7B (along AA line) and 7C along BB line) cross selection structure, the touch panel 300 further includes a protecting layer P. The protecting layer P is disposed on the transparent layer 313 and the decoration pattern 390, and directly contacts the transparent layer 313 and the decoration pattern 390. That is, the protecting layer P directly covers the decoration pattern 390, the electric-control traces 400 (as shown in FIG. 7B), the transparent substrate 310 and the touch-sensitive electrode pattern 320 (as shown in FIG. 7C), so as to protect the decoration pattern 390, the electric-control traces 400 and the touch-sensitive electrode pattern 320 from being damaged by an external force. The material of the protecting layer P is for example poly methacrylate or acrylic polymer. However, the disclosure is not limited to this.

It should be understood that in this embodiment after the touch panel 300 is combined to the display 200 (as shown in FIG. 1), the protecting layer P can directly adhere to the display 200 through an adhesive layer (not shown). Therefore, it can be seen that the stacked structure of the touch panel 300 is thinned to an extent, which is beneficial for the miniaturizing design of the touch-controlled display device 100. However, the disclosure is not limited to this, and the touch panel 300 may not have the protecting layer.

Figure 8:
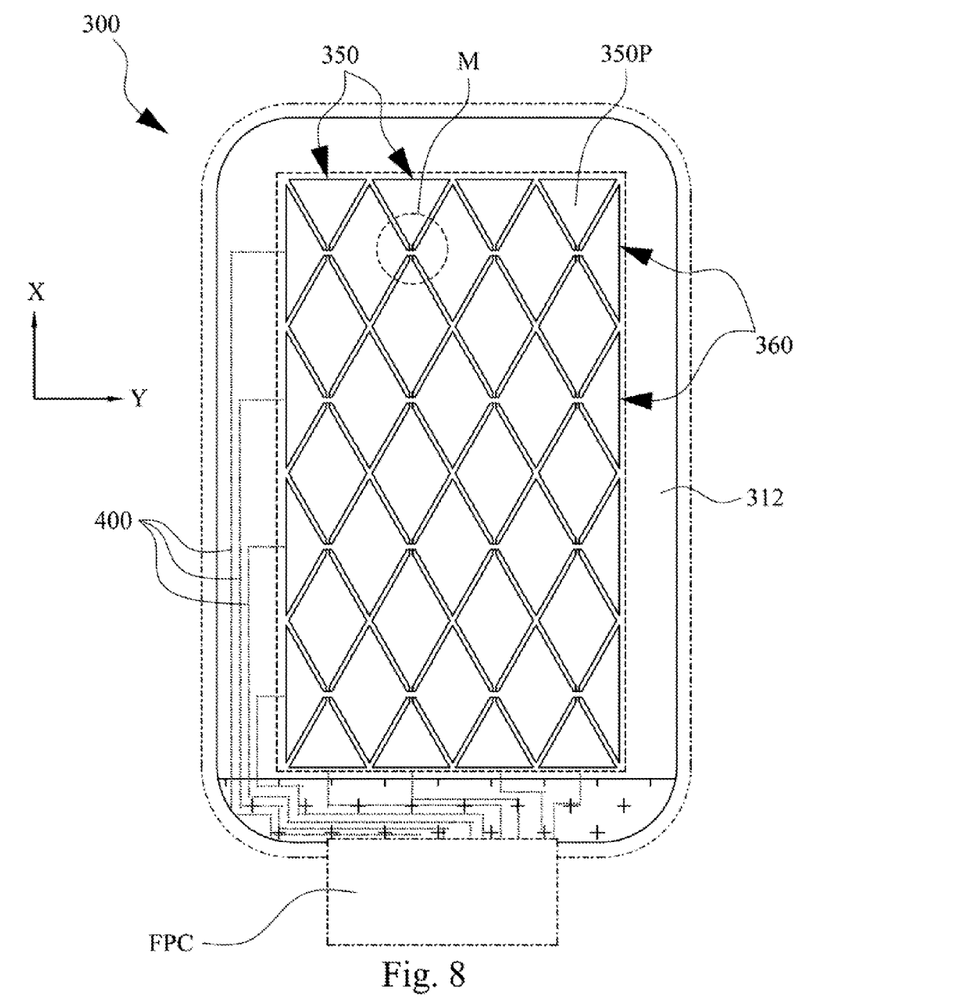
FIG. 8 is a top view of another embodiment of the touch panel of the disclosure.
Figure 9:
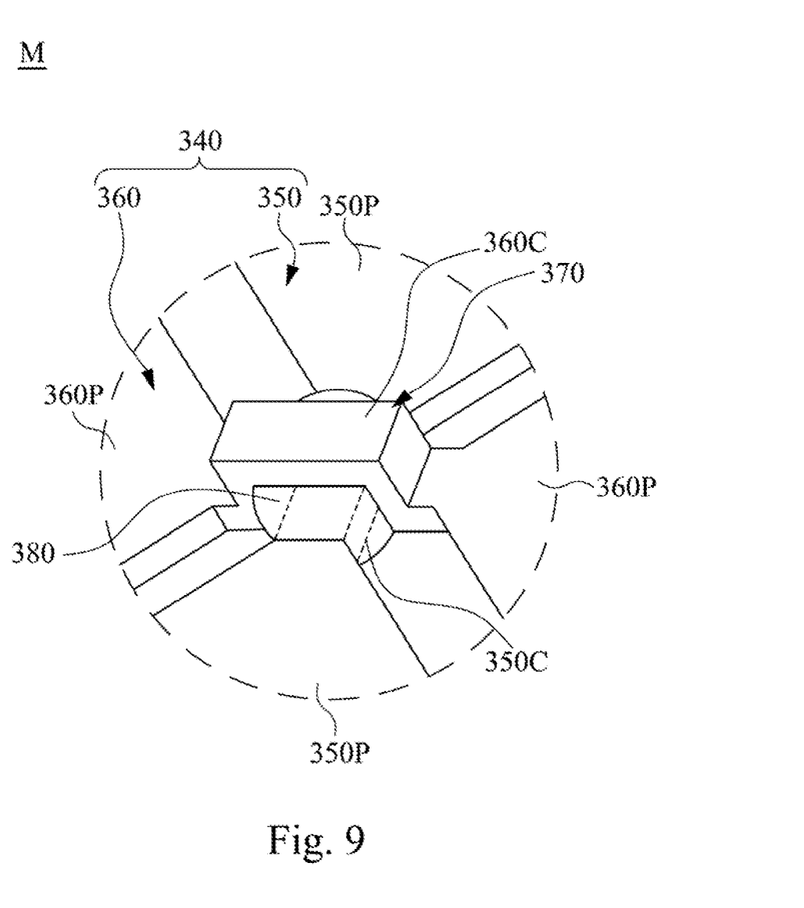
FIG. 9 is a partially enlarged view of an area M of FIG. 8.

References are made to FIGS. 8 and 9. FIG. 8 is a top view of another embodiment of the touch panel 300 of the disclosure. FIG. 9 is a partially enlarged view of an area M of FIG. 8.

The touch-sensitive electrode pattern 340 (including the first axial sensing electrode 350 and the second axial sensing electrode 360) and the electric-control traces 400 in this embodiment form a multi-layer structure disposed on the rear surface 312 of the transparent substrate 310, which includes a sensing electrode pattern layer 340, a sensing wiring layer (bridging layer) 370 and an insulation layer 350. The sensing electrode pattern layer 340 is directly disposed on the transparent substrate 310. The sensing wiring layer 370 is disposed on the insulation layer 350. The insulation layer 350 covers part of the sensing electrode pattern layer 350, and is between the sensing electrode pattern layer 350, the sensing electrode pattern layer 360 and the sensing wiring layer 370, so as to block the electrical connection between the sensing electrode pattern layer 340 and the sensing wiring layer 370. In other variations of the embodiment, a protecting layer (not shown) may further cover the sensing wiring layer 370 to protect the aforesaid multi-layer structure. However, the disclosure is not limited to this.

Particularly, referring to FIG. 9 the aforesaid sensing electrode pattern layer 340 includes a first axial sensing electrode 350 (such as the X axial) and a second axial sensing electrode 360 (such as the Y axial). The first axial sensing electrode 350 has multiple first sensing electrodes 350P and first connection portions 350C used for connecting any two of the first sensing electrodes 350P. The second axial sensing electrode 360 has multiple second sensing electrodes 360P. The sensing wiring layer 370 includes multiple second connection portions 360C used for connecting any two of the second sensing electrodes 360P. Any two of the second sensing electrodes 360P are connected by the second connection portion 360C through a jumper manner, and the second connection portion 360C crosses over the first connection portion 350C. Through the aforesaid insulation layer 350, the second connection portion 360C and the first connection portion 350C are insulated to each other. The sensing wiring layer 370 may be made of a material the same as or different from the sensing electrode pattern layer 340.

Compared with the single-layer structure of FIG. 76, the multi-layer structure of FIG. 9 has an additional insulation layer 350. The insulation layer 350 enables the sensing wiring layer (bridging layer) 370 and the second axial sensing electrode 360 to be located at different height levels, so that the sensing wiring layer (bridging layer) 370 and the second axial sensing electrode 360 are located at different layers.

It should be understood that, the aforesaid touch area T and surrounding area S are defined only to identify the relationships between the touch-sensitive electrode pattern 320, the decoration pattern 390 and the electric-control traces 400 more clearly. The actual surface of the transparent substrate 310 may not be divided into the touch area T and the surrounding area S through certain marks. Furthermore, in the accompanying figures of the disclosure, pecked lines are used to represent the low visibility characteristics of the electric-control traces 400, such that the electric-control traces 400 all exist on the rear surface 312 of the transparent substrate 310.

In view of the above, since the electric-control traces of the touch panel of the disclosure are invisible or have low visibility characteristics, it is not required to use a shield frame to shield the electric-control traces, which is beneficial for reducing the area of the screen frame, and can even reduce the frame side part number of the screen frame so as to expand the visual area of the touch-controlled display device and increase the appearance beauty thereof. Furthermore, the aforesaid structure of the touch panel of the disclosure can also simplify the processing steps, further improve the yield, and avoid increase of the material and development cost.

Although the disclosure has been disclosed with reference to the above embodiments, these embodiments are not intended to limit the disclosure. It will be apparent to those of skills in the art that various modifications and variations can be made without departing from the spirit and scope of the disclosure. Therefore, the scope of the disclosure shall be defined by the appended claims.

What is claimed is:

1. A touch panel, comprising:
   a transparent substrate comprising a touch area and a surrounding area surrounding the touch are, wherein the surrounding area has two first strip-shaped areas which are respectively adjacently disposed at two opposite sides of the touch area, and two second strip-shaped areas which are respectively adjacently disposed at the other two opposite sides of the touch area;
   a touch-sensitive electrode pattern disposed on the touch area of the transparent substrate;
   a decoration pattern having two having two strips totally separated to each other and respectively adjacently disposed at two opposite sides of the touch-sensitive electrode pattern, and each of the two strips respectively completely covering one of the two first strip-shaped areas of the surrounding area of the transparent substrate for completely shielding the one of the two first strip-shaped areas of the surrounding area of the transparent substrate, so that the two second strip-shaped areas of the surrounding area of the transparent substrate not shielded by the decoration pattern is able to be seen through, wherein the two second strip-shaped areas of the surrounding area of the transparent substrate are respectively adjacently disposed at the other two opposite sides of the touch-sensitive electrode pattern, and the two second strip-shaped areas of the surrounding area of the trans transparent substrate have none of the decoration pattern, completely; and
   a plurality of electric-control traces located in the surrounding area, each of the electric-control traces being directly formed on one of the two strips of the decoration pattern and one of the two second strip-shaped areas of the surrounding area of the transparent substrate not shielded by the decoration pattern, and electrically connected to the touch-sensitive electrode pattern, wherein each of the two strips of the decoration pattern is sandwiched between the electric-control traces and the transparent substrate, and each of the electric-control traces comprises transparent material, or each of the electric-control traces comprises non-transparent material and has a micron-size width.

2. The touch panel of claim 1, wherein the micron-size width is less than 50 micrometers.

3. The touch panel of claim 2, wherein the micron-size width is in a range of 2-10 micrometers.

4. The touch panel of claim 2, wherein the material of each of the electric-control traces is conductive metal or conductive non-metal.

5. The touch panel of claim 1, wherein the touch-sensitive electrode pattern comprises:
a sensing electrode pattern layer and a sensing wiring layer disposed on the transparent substrate; and
an insulation layer disposed between the sensing electrode pattern layer and the sensing wiring layer, insulating the electrical connection between the sensing electrode pattern layer and the sensing wiring layer.

6. The touch panel of claim 1, wherein both the touch-sensitive electrode pattern and the electric-control traces are made of the same material and formed in same layer to constitute a one-layer structure.

7. The touch panel of claim 1, wherein the touch sensitive electrode pattern and the electric-control traces are made of a metal material and formed in same layer to constitute a metal-mesh structure.

8. The touch panel of claim 1, wherein the transparent substrate is a color filter, an active component array substrate or a polarizing plate.

9. The touch panel of claim 1, wherein each of the electric-control traces has one segment not stacked on the decoration pattern comprising light-permeable material, and a rest segment of the same electric-control trace directly stacked on the decoration pattern comprises light-tight metal material.

10. The touch panel of claim 1, wherein each of the electric-control traces has one segment not stacked on the decoration pattern is miniaturized, and a width of a rest segment of the same electric-control trace directly stacked on the decoration pattern is larger than a width of the miniaturized segment of the electric-control trace.

11. A touch panel, comprising:
a transparent substrate comprising a touch area and a surrounding area surrounding the touch area, wherein the surrounding area has two first strip-shaped areas which are respectively adjacently disposed at two opposite sides of the touch area, and two second strip-shaped areas which are respectively adjacently disposed at the other two opposite sides of the touch area;
a decoration pattern having two strips totally separated to each other, and each of the two strips respectively completely covering one of the two first strip-shaped areas of the surrounding area of the transparent substrate for completely shielding the one of the two first strip-shaped areas of the surrounding area of the transparent substrate, so that the two second strip-shaped areas of the surrounding area of the transparent substrate not shielded by the decoration pattern is able to be seen through, wherein the two second strip-shaped areas of the surrounding area of the transparent substrate have none of the decoration pattern, completely; and
a transparent layer disposed on the transparent substrate and the decoration pattern,
wherein the transparent layer comprises a touch-sensitive electrode pattern and a plurality of electric-control traces, the touch-sensitive electrode pattern is disposed on the touch area of the transparent substrate, and the two strips are respectively adjacently disposed at two opposite sides of the touch-sensitive electrode pattern, and the two second strip-shaped areas of the surrounding area of the transparent substrate are respectively adjacently disposed at the other two opposite sides of the touch-sensitive electrode pattern, the electric-control traces are disposed on the surrounding area, wherein each of the electric-control traces is directly formed on one of the two strips of the decoration pattern and one of the two second striped-shaped areas of the surrounding area of the transparent substrate not shielded by the decoration pattern, wherein each of the two strips of the decoration pattern is sandwiched between the electric-control traces and the transparent substrate.

12. The touch panel of claim 11, wherein the touch-sensitive electrode pattern and the electric-control traces are integrated together to constitute a one-layer structure and disposed directly on the transparent substrate and the decoration pattern.

13. The touch panel of claim 12, wherein the transparent layer is made of metal material to constitute a metal-mesh structure.

14. The touch panel of claim 11 further comprising:
a protecting layer located on the transparent layer and the decoration pattern, and directly contacting the transparent layer and the decoration pattern.

15. The touch panel of claim 11, wherein each of the electric-control traces has one segment not stacked on the decoration pattern comprising light-permeable material, and a rest segment of the same electric-control trace directly stacked on the decoration pattern comprises light-tight metal material.

16. The touch panel of claim 11, wherein each of the electric-control traces has one segment not stacked on the decoration pattern is miniaturized, and a width of a rest segment of the same electric-control trace directly stacked on the decoration pattern is larger than a width of the miniaturized segment of the electric-control trace.

* * * * *